United States Patent [19]
McPhee

[11] 3,900,180

[45] Aug. 19, 1975

[54] SUPER-SAFE TOWEL HOOK

[75] Inventor: John L. McPhee, Burlingame, Calif.

[73] Assignee: Aluminum Plumbing Fixture Corporation, Burlingame, Calif.

[22] Filed: Apr. 10, 1974

[21] Appl. No.: 459,556

[52] U.S. Cl. .................. 248/288; 248/309; 403/90
[51] Int. Cl.² ........................................ F16B 45/00
[58] Field of Search ........................... 248/481–483, 248/181, 288, 294, 309, 291, 289, 290, 292, 293, 304, 306, 475 A, 475 B; 403/90; 52/27, 34, 38, 106

[56] References Cited
UNITED STATES PATENTS

| 807,857 | 12/1905 | Palmenberg | 248/288 |
|---|---|---|---|
| 2,338,780 | 1/1944 | Poncher et al. | 248/483 |
| 2,901,207 | 8/1959 | Adam | 248/294 |
| 3,191,498 | 6/1965 | Priebe | 248/481 |
| 3,747,884 | 7/1973 | Steisslinger et al. | 248/181 |
| 3,847,336 | 11/1974 | Morris et al. | 248/294 |

FOREIGN PATENTS OR APPLICATIONS

| 29,853 | 10/1911 | United Kingdom | 248/294 |
|---|---|---|---|
| 47,930 | 10/1933 | Denmark | 248/294 |

*Primary Examiner*—Roy D. Frazier
*Assistant Examiner*—Lawrence J. Staab
*Attorney, Agent, or Firm*—Robert G. Slick

[57] ABSTRACT

A towel hook is provided which incorporates a spring loaded ball joint whereby the hook has only enough strength in any direction to support a towel or the like but which will yield if more substantial pressure is placed upon it. The hook is designed for use in mental institutions or the like and it is impossible to use the towel hook for committing suicide.

1 Claim, 3 Drawing Figures

PATENTED AUG 19 1975  3,900,180

SUPER-SAFE TOWEL HOOK

SUMMARY OF THE INVENTION

In mental or penal institutions it is highly desirable that any article within a cell be safe from use by a potential suicide. In the past, towel hooks have often been used for committing suicide since it is only necessary that one hook a string or cloth member over the hook for strangulation purposes.

Hooks have been proposed in the past which will swing downwardly upon the application of substantial pressure but with such hooks it is always possible to obtain sufficient strangulation pressure by pulling sidewise.

In accordance with the present invention, a towel hook is provided wherein the only protruding part is mounted on a universal ball joint which is pressurized only to the extent necessary to hold a towel or an article of clothing and which will not provide sufficient strength to permit the hook to be used as a suicide device. This is true regardless of whether pressure is brought straight down on the hook or to one side.

A further advantage of the present invention is that it can be mounted on a cabinet with only the hook and a portion of the ball protruding so that there are no screws or the like accessible to a patient which would permit one to remove the device or to jam it in any manner.

Any excessive side pressure, such as kicking the hook, will release the same in the direction of movement so that it is impossible to break the hook by kicking it or by similar action.

The design of the hook is such that the ball joint and hook element proper are made of a single piece of metal so that the hook cannot be unscrewed from the ball.

The structure is also such that it is impossible to wedge the hook in any position.

Other features will be brought out in the balance of the specification.

DESCRIPTION OF THE PREFERRED EMBODIMENTS

Figure 1:
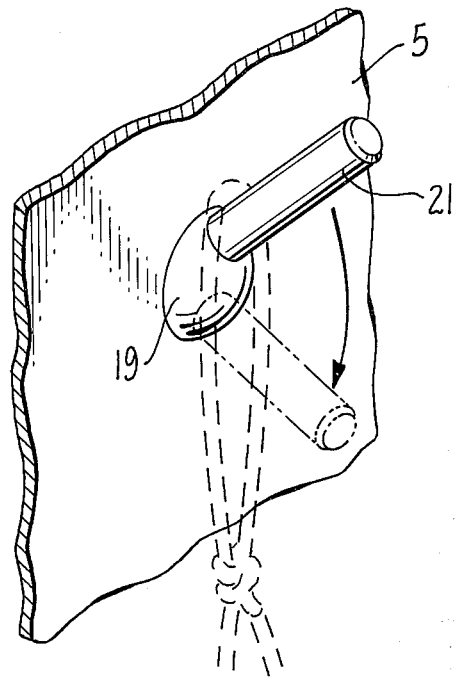
FIG. 1 is a perspective view of a towel hook embodying the present invention, showing it mounted on a wall.
Figure 2:
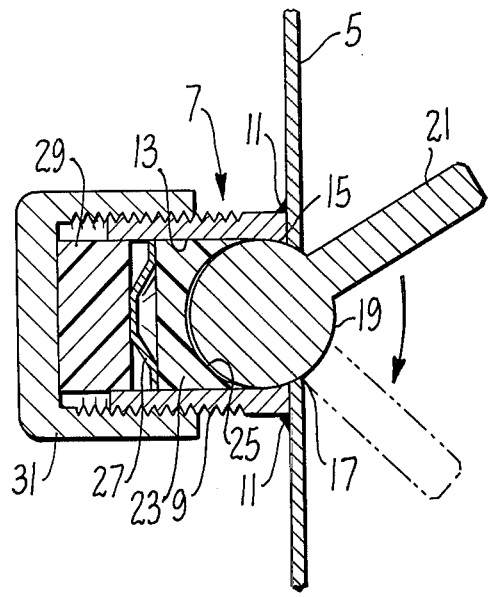
FIG. 2 is a section through the center of the hook.

Referring now to the drawings by reference characters, the hook of the present invention is mounted on a wall 5 which would normally be made of stainless steel. This could be a cell wall or could be the front wall of a sanitary fixture. A nipple 7 having a threaded portion 9 is fastened to the rear surface of the wall by welding 11. Nipple 7 has a cylindrical inner wall 13 throughout most of its length but near the point of attachment to the wall it is curved inwardly as at 15, forming a restriction or lip at the end of the nipple. Preferably the steel wall 5 is chamfered as at 17 to continue the inward turning curvature of the nipple end.

The hook element consists of a ball 19 and a rod 21 which are preferably formed out of a single piece of steel or are fabricated by welding two parts together. Regardless of the method of making the rod and ball, they are solidly formed together so that one cannot be unscrewed from the other. Ball 19 is of a diameter to pass freely inside the cylindrical portion 13 of the nipple 7 but it will engage and be retained by the inturned lip 15 of the nipple. A cup 23, suitably formed of a plastic such as nylon is provided which has a cup-shaped inner portion 25 corresponding in configuration to ball 19 and a cylindrical exterior shape whereby it can slide freely within the nipple. A spring washer 27 is provided as well as a pressure plug 29, both of a diameter selected to pass freely within the nipple. A threaded cap 31 completes the assembly.

Figure 3:
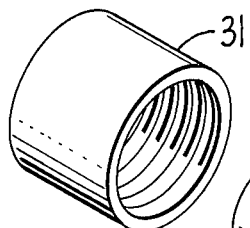
FIG. 3 is an exploded view of the members forming the hook.
Figure 3:
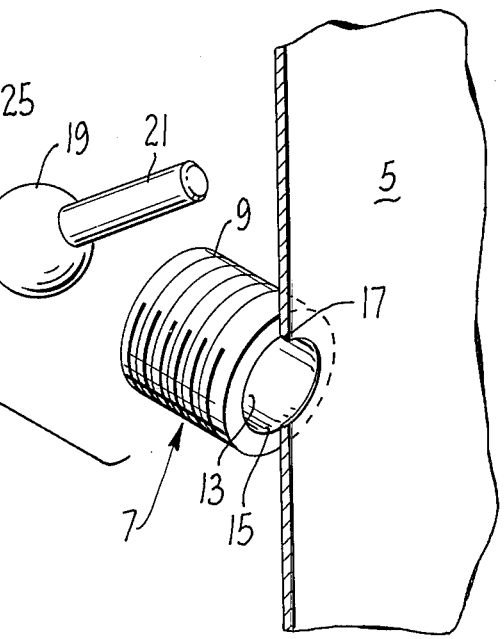

As it can best be seen in FIG. 3, the safety hook is assembled by passing the rod 21 through the nipple whereupon ball 19 will engage on lip 15. Cup 23, spring washer 27 and plug 29 are then inserted in the nipple and cap 31 is screwed on. The pressure on spring 27 can be regulated by screwing cap 31 to a desired amount. However, the cap 31 is accessible only from the rear of the structure so that the inmate cannot change this adjustment in any manner.

It is believed apparent from the foregoing that the hook of the present invention will yield in any direction so that it cannot be used as an instrument of suicide, cannot be broken by kicking it, and no removable part is accessible to an inmate. Thus, the hook of he present invention is substantially indestructible by an inmate, yet cannot be used as a suicide instrument.

Although a certain specific structure has been illustrated, it will be obvious to those skilled in the art that many variations can be made without departing from the spirit of this invention.

I claim:

1. A safety hook for towels and the like for use in the prevention of suicide by a person confined within a space at least part of which is defined by a wall, said safety hook being incapable of resisting a substantial force either from horizontal or vertical forces, said safety hook comprising in combination:
   a. an enclosure defining said space and including at least one wall, said wall having a first surface exposed to the interior of said enclosure and a second surface exposed to the exterior of said enclosure,--.
   b. a hole in said wall,
   c. a nipple extending outwardly from said hole on the second surface of said wall,
   d. a constriction in said nipple adjacent to the point where the nipple enters the wall,
   e. a towel holder comprising a ball-shaped member with a rod extending therefrom, said ball-shaped member being inserted in said nipple and said rod extending through said hole beyond the first surface of said wall,
   f. said nipple being of a size to permit the entrance of said ball and said constriction being so small that the ball cannot pass there through,
   g. means mounted behind said second surface within said nipple whereby tension on said ball can be adjusted.

* * * * *